United States Patent
L'Bassi et al.

(10) Patent No.: US 8,997,791 B2
(45) Date of Patent: Apr. 7, 2015

(54) MULTIPLE-CHANNEL FLOW RATIO CONTROLLER

(75) Inventors: Michael L'Bassi, Sterling, MA (US); Junhua Ding, Tewksbury, MA (US); David D'Entremont, Stoneham, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 11/279,786

(22) Filed: Apr. 14, 2006

(65) Prior Publication Data

US 2007/0240778 A1  Oct. 18, 2007

(51) Int. Cl.
*F16K 11/20* (2006.01)
*G05D 7/06* (2006.01)

(52) U.S. Cl.
CPC .................. *G05D 7/0664* (2013.01)

(58) Field of Classification Search
USPC .................. 137/269, 271, 884, 887; 700/282
See application file for complete search history.

(56) References Cited

U.S. PATENT DOCUMENTS

| | | | |
|---|---|---|---|
| 4,369,031 A | 1/1983 | Goldman et al. | |
| 6,333,272 B1 | 12/2001 | McMillin et al. | |
| 6,418,954 B1 | 7/2002 | Taylor et al. | |
| 2003/0130807 A1 | 7/2003 | Ambrosina et al. | |

FOREIGN PATENT DOCUMENTS

| | | |
|---|---|---|
| JP | 2000-330643 | 11/2000 |
| JP | 2002-132350 | 5/2002 |
| JP | 2003-108231 | 4/2003 |
| TW | 200610551 | 4/2006 |
| WO | WO 02/95519 A1 | 11/2002 |

OTHER PUBLICATIONS

PCT International Search Report for related PCT Application No. PCT/US2007/005429 (6 pages).
PCT Written Opinion of the International Searching Authority for related PCT Application No. PCT/US2007/005429 (10 pages).
English Version of Search Report dated Aug. 2, 2013 from Corresponding Taiwan Patent Application No. 96112952.

*Primary Examiner* — John Fox
(74) *Attorney, Agent, or Firm* — McDermott Will and Emery LLP (57) ABSTRACT

A system for dividing a single mass flow into a plurality N of secondary flows includes an inlet configured to receive the single mass flow, a master FRC (flow ratio controller), and one or more slave FRCs. Each FRC is connected to the inlet and including at least one flow channel. The master FRC and the slave FRCs include in combination a total of N flow channels. Each flow channel i (i=1, ..., N) is connected to carry a corresponding one of the N secondary flows. In response to preselected ratio setpoints received from a host controller, the master FRC and the slave FRCs maintain ratios $Q_i/Q_T$ (i=1, ..., N) between individual flow rates $Q_i$ (i=1, ..., N) and a total flow rate $Q_T$ at the preselected ratio set points.

13 Claims, 6 Drawing Sheets

FIG. 4

MULTIPLE-CHANNEL FLOW RATIO CONTROLLER

BACKGROUND

In a number of applications, it may be necessary to deliver precise amounts of gases or other fluids to processing chambers and/or other processing facilities. These applications may include, but are not limited to, the fabrication of semiconductor systems.

For some applications, it may be necessary to divide or split combined process gases or other fluids among multiple processing facilities. Examples of flow splitting applications may include, but are not limited to, etching, stripping, and PECVD (Plasma Enhanced Chemical Vapor Deposition). In these cases, a single outlet of a gas box that contains the combined process gases may be connected to multiple chambers and/or processing facilities, through secondary flow channels.

An FRC (flow ratio controller) may be used to divide a primary flow among a plurality of secondary flow channels, in accordance with preselected ratios. A number of designs have been implemented for dual channel flow ratio controllers (DCFRCs), which split a single mass flow into two secondary flow channels.

In some applications, a multiple-channel flow ratio controller (MCRFC) may be needed in order to split a single mass flow into more than two secondary flows. In one approach, an MCFRC may be implemented by linking a number of DCFRCs in a cascaded configuration. The cascaded configuration may result in a high pressure drop across the MCFRC, however. Also, the cascaded set of DCFRCs may have a large footprint, and be costly. Further, the cascaded configuration for DCFRCs may constrain the total number N of flow channels to be $N=2^n$, which may considerably decrease flexibility.

Accordingly, there is a need for improved systems and methods for implementing an MCFRC.

SUMMARY

A system for dividing a single mass flow into a plurality N of secondary flows includes an inlet configured to receive the single mass flow, and a master FRC and one or more slave FRCs connected to the inlet. The master FRC and the slave FRCs each include at least one secondary flow channel, and in combination include a number N of secondary flow channels. Each secondary flow channel i (i=1, . . . , N) is connected to carry a corresponding one of the N secondary flows. The master FRC is configured to receive preselected ratio set points from a host controller, and to deliver to the slave FRCs the preselected ratio set points along with one or more command signals so that ratios $Q_i/Q_T$ (i=1, . . . , N) between individual flow rates $Q_i$ (i=1, . . . , N) and a total flow rate $Q_T$ can be maintained at the preselected ratio set points, where $Q_i$ represents the individual flow rate in the secondary flow channel i, and $Q_T$ represents a sum $Q_T=Q_1+\ldots+Q_i+\ldots Q_N$ of all N individual flow rates.

A system for dividing a single mass flow into a plurality N of secondary flows includes an inlet configured to receive the single mass flow, a plurality N of secondary flow channels i (i=1, . . . , N), and a controller. The N secondary flow channels are connected to the inlet, and are connected to carry corresponding ones of the N secondary flows. Each secondary flow channel i (i=1, . . . , N) includes a flow sensor connected to measure a flow rate $Q_i$ through the flow channel i, and a valve connected to regulate flow through the flow channel i in response to a control signal. The controller is configured to control the flow sensors and the valves in all of the N flow channels so as to maintain ratios $Q_i/Q_T$ (i=1, . . . , N) between individual flow rates $Q_i$ (i=1, . . . , N) and a total flow rate $Q_T$ at preselected ratio set points, where $Q_i$ represent individual flow rates in corresponding flow channels i, and $Q_T$ represents a sum $Q_T=Q_1+\ldots+Q_i+\ldots Q_N$ of all N individual flow rates.

A gas delivery system includes a multiple-channel flow ratio controller (MCFRC) configured to divide a single gas flow into a plurality N of secondary flows. The MCFRC includes a master FRC (flow ratio controller), and one or more slave FRCs. Each FRC includes at least one flow channel, and is connected to an inlet configured to receive the single gas flow. The master FRC and the slave FRCs include in combination a total of N flow channels. Each flow channel i (i=1, . . . , N) is connected to carry a corresponding one of the N secondary flows. The master FRC is configured to receive preselected ratio set points from a host controller, and to deliver to the slave FRCs the preselected ratio set points along with one or more command signals so that the ratios $Q_i/Q_T$ (i=1, . . . , N) between individual flow rates $Q_i$ (i=1, . . . , N) and a total flow rate $Q_T$ can be maintained at preselected ratio set points, wherein $Q_i$ represents individual flow rate in flow channel i, and $Q_T$ represents a sum $Q_T=Q_1+\ldots+Q_i+\ldots Q_N$ of all N individual flow rates.

A method of controlling flow in a plurality N of secondary flows that derive from a single mass flow includes connecting a master FRC and one or more slave FRCs to an inlet configured to receive the single mass flow. The master FRC and the slave FRCs include in combination a total of N flow channels, where each flow channel i (i=1, . . . , N) is connected to carry a corresponding one of the N secondary flows. The master FRC and the slave FRCs maintain, in all of the N flow channels, ratios $Q_i/Q_T$ (i=1, . . . , N) between individual flow rates $Q_i$ (i=1, . . . , N) and total flow rate $Q_T$ at preselected ratio set points, where $Q_i$ represents individual flow rate in flow channel i, and $Q_T$ represents a sum $Q_T=Q_1+\ldots+Q_i+\ldots Q_N$ of all N individual flow rates.

DETAILED DESCRIPTION

A multiple-channel flow ratio controller (MCFRC) is described that includes a master FRC connected to one or more slave FRCs through a digital communication network. The master FRC, together with the slave FRCs, split an incoming flow into a plurality of secondary flows that have preselected flow ratios set by a host controller.

Figure 1A:
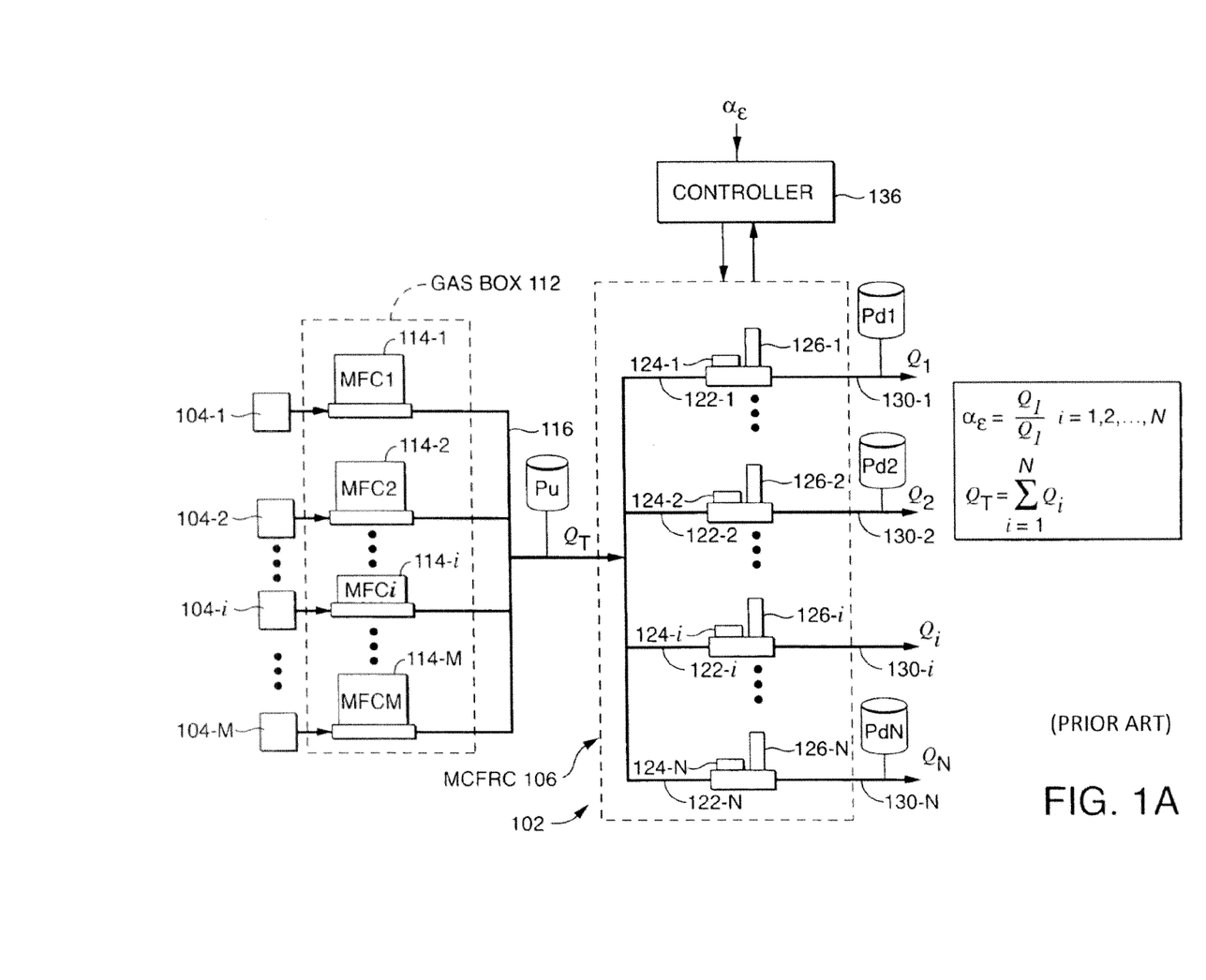
FIG. 1A is a general block diagram of a gas delivery system that includes an MCFRC.

FIG. 1A is a general block diagram of a gas delivery system 102 that includes an MCFRC 106 configured to divide a single flow of gas into a plurality of secondary flows $Q_1, \ldots Q_i, \ldots, Q_N$ having preselected ratios $Q_i/Q_T$, where $Q_T$ is the sum of the flows in all N of the secondary flow channels, i.e. $Q_T = Q_1 + \ldots + Q_i + \ldots Q_N$. The MCFRC 106 receives individual gases or mixtures of multiple gases, which may be supplied from gas suppliers, for example gas tanks. The gas suppliers are shown in FIG. 1 using reference numerals 104-1, 104-2, ..., 104-i, ..., 104-M. A gas mixture may include, by way example, a number of different process gases and a purge gas. Many different gas mixtures may also be supplied.

A gas box 112 may deliver the individual gases or gas mixtures to the MCFRC 106, which in turn may deliver the secondary flows $Q_1, \ldots, Q_i, \ldots, Q_N$ to respective process chambers (not shown). Alternatively, the gases may be metered to different injectors or areas of a single process chamber and or other processing tools. The gas box 112 may include a plurality of gas sticks 114-1, ..., 114-i, ..., 114-M, each gas stick 114-i in fluid communication with a corresponding gas supplier 104-i.).

Each gas stick 114-i (i=1, ..., M) may individually control the flow of gas from the corresponding gas supplier 104-i (i=1, ..., M). Each gas stick 114-i may include a mass flow controller (MFC). The MFCs for the gas sticks are illustrated in FIG. 1 as $MFC_1, MFC_2, \ldots, MFC_i, \ldots, MFC_M$ within each gas stick. Each gas stick may also include a valve (not shown) positioned before and after the MFC, as described in U.S. Pat. No. 6,418,954 for example. The gas sticks 114-i may each provide a controllable gas passageway so that a precisely metered amount of a gas (or a combination of gases) can be supplied to the MCFRC 106. The MCFRC 106 may then accurately split/divide the gas or combination of gases into secondary flows $Q_i$, each having preselected flow ratios $Q_i/Q_T$. The gas sticks 114-i may each be provided with other components (not shown) for monitoring or controlling gases, such as filters, purifiers, pressure transducers, and valve controllers.

The gas sticks 114-i may connect together, for example to an outlet manifold 116, to allow the gas flows from each stick to be mixed if desired prior to leaving the gas box 112. The outlet manifold 116 is connected to the MCFRC 106, as shown in FIG. 1.

The MCFRC 106 includes a plurality of secondary flow channels 122-1, ..., 122-i, ..., 122-N. Each secondary flow channel 122-i includes a flow sensor 124-i and a valve 126-i. The sensor 124-i measures the flow rate though the secondary flow channel 122-i, and generates a flow rate signal for use in controlling the valve 126-i, which regulates the mass flow through the secondary flow channel 122-i. The sensors 124-i and valves 126-i are thus used together to control the output mass flows $Q_i$ in the secondary flow channels, and thus the flow ratios $\alpha_i = Q_i/Q_T$, where $Q_T$ is the sum of the flows in all N of the secondary flow channels, i.e. $Q_T = Q_1 + \ldots + Q_i + \ldots Q_N$. The outlets 130-1, ..., 130-i, ..., 130-N of each of the secondary flow channels may be connected to one or more corresponding processing chambers or other facilities (not shown).

A controller 136 for the MCFRC 106 may be configured to receive inputs $\alpha_i$ representing the preselected values or set points of the ratios of the flow rates $Q_i$ through each of the flow channels 122-i with respect to the total flow rate $Q_T$. The controller 136 may be configured, among other things, to control and maintain the preselected ratios $\alpha_i$ at the preselected set points.

Figure 1B:
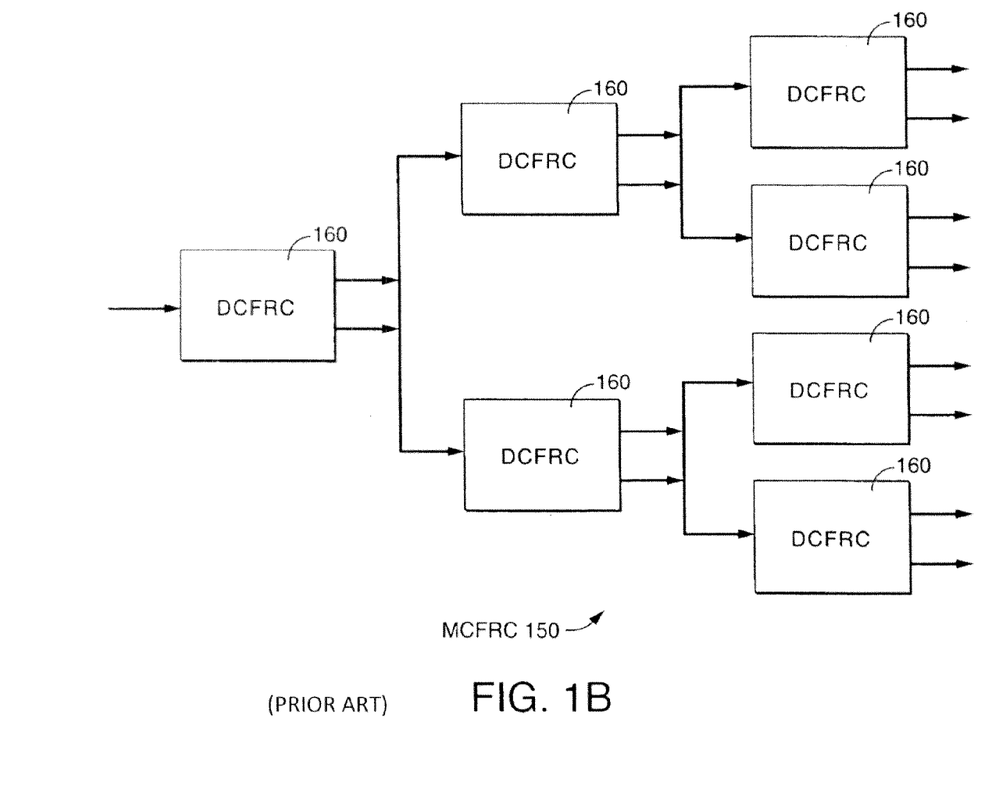
FIG. 1B shows a cascaded configuration for an MCFRC.

MCFRCs may be implemented by using DCFRCs as building blocks, in which case it may be possible to build upon the existing hardware and software in the DCFRCs. FIG. 1B illustrates an MCFRC 150 that builds upon DCFRCs by linking a plurality of DCFRCs 160 in a cascade configuration. The MCFRC 150 having the cascaded configuration may be easily implemented, with little or no modification to existing hardware or software. The MCFRC 150 may therefore be made readily available to customers using existing DCFRCs that are commercially available, including for example the Delta II FRCs manufactured by MKS Instruments, Inc. A cascaded set of DCFRCs may result, however, in an undesirably high pressure drop across the MCFRC. Each additional DCFRC that is added onto the cascade configuration would contribute to a corresponding increase in pressure drop across the MCFRC. A cascaded set of DCFRCs may also result in high costs and lack of flexibility for the consumer because the number of DCFRCs is greater than that of the parallel configuration which is discussed in the next paragraph.

Figure 2A:
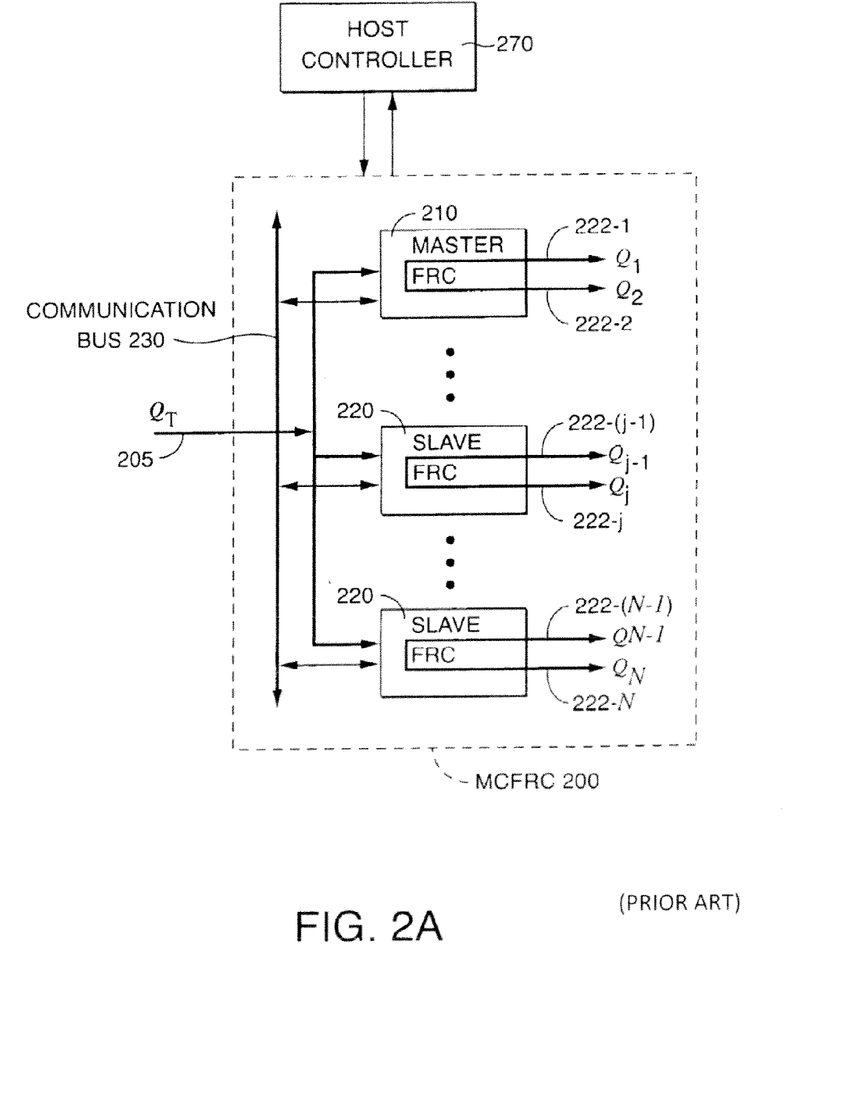
FIG. 2A is a general block diagram of an MCFRC that includes a master FRC and a plurality of slave FRCs linked in a parallel configuration through a digital communication network, in accordance with one embodiment of the present disclosure.

In accordance with one embodiment of the present disclosure, illustrated in FIG. 2A, a master FRC 210 and a plurality of slave FRCs 220 are linked in a parallel configuration through a digital communication network. FIG. 2A is a general block diagram of an MCFRC 200 in which the master FRC 210 and the slave FRCs 220 are all connected to an inlet 205 configured to receive the single mass flow. The master FRC 210 and the slave FRCs 220 each include at least one secondary flow channel. In combination, the master FRC and the slave FRCs include a total of N secondary flow channels 222-i (i=1, ..., N). Each secondary flow channel 222-i (i=1, ..., N) is connected to carry a corresponding one of the N secondary flows.

In the exemplary embodiment illustrated in FIG. 2A, the master FRC 210 as well as all the slave FRCs 220 are shown as dual-channel FRCs that have two secondary flow channels each. The master FRC 210 is illustrated as including secondary flow channels 222-1 and 222-2, respectively carrying secondary flows $Q_1$ and $Q_2$. The slave FRCs 220 are illustrated as each including two secondary flow channels 222-(j-1) and 222-j (where in the illustrated example j=3, ..., N, since the master FRC includes the first two flow channels 222-1 and 222-2).

Although the exemplary embodiment illustrates the master and the slave FRCs as having two secondary flow channels each, it should be understood that in other embodiments of the present disclosure, any number (including one) of secondary flow channels may be included by either the master FRC 210 or by any one of the secondary FRCs 220. Further, although the master FRC 210 is illustrated as including the first two flow channels 222-1 and 222-2, in other embodiments of the present disclosure, the master FRC 210 may include any different ones of the flow channels, including but not limited to flow channels 222-(j-1) and 222-j, and flow channels 222-(N-1) and 222-N.

A host controller 270, which may be a host computer for example, is configured to send the preselected flow ratio setpoints to the master FRC 210. The master FRC 210 delivers the flow ratio setpoints along with other control commands to the slave FRCs 220 so as to maintain ratios $Q_i/Q_T$ (i=1, ..., N) between individual flow rates $Q_i$ (i=1, ..., N) and the total flow rate $Q_T$ at preselected ratio set points, where $Q_i$ represents the individual flow rate in flow channel i, and $Q_T$ represents a sum $Q_T = Q_1 + \ldots + Q_i + \ldots Q_N$ of all N individual flow rates. The host controller 270 may query the status of the master FRC and/or the slave FRCs and the actual flow ratio in each flow channel i.

In one embodiment, the master FRC 210 and the slave FRCs 220 may be configured to communicate with each other and with the host controller 270 through a digital communications network. The network may include, but is not limited to, one or more of the following: Ethernet TCP/IP; UDP/IP; DeviceNet; CAN (Controller Area Network); RS-232; and RS-485. A digital communication bus 230, shown in FIG. 2A, enables communications between the master FRC 210 and the slave FRCs 220, or the master FRC 210 and the host controller 270.

Figure 2B:
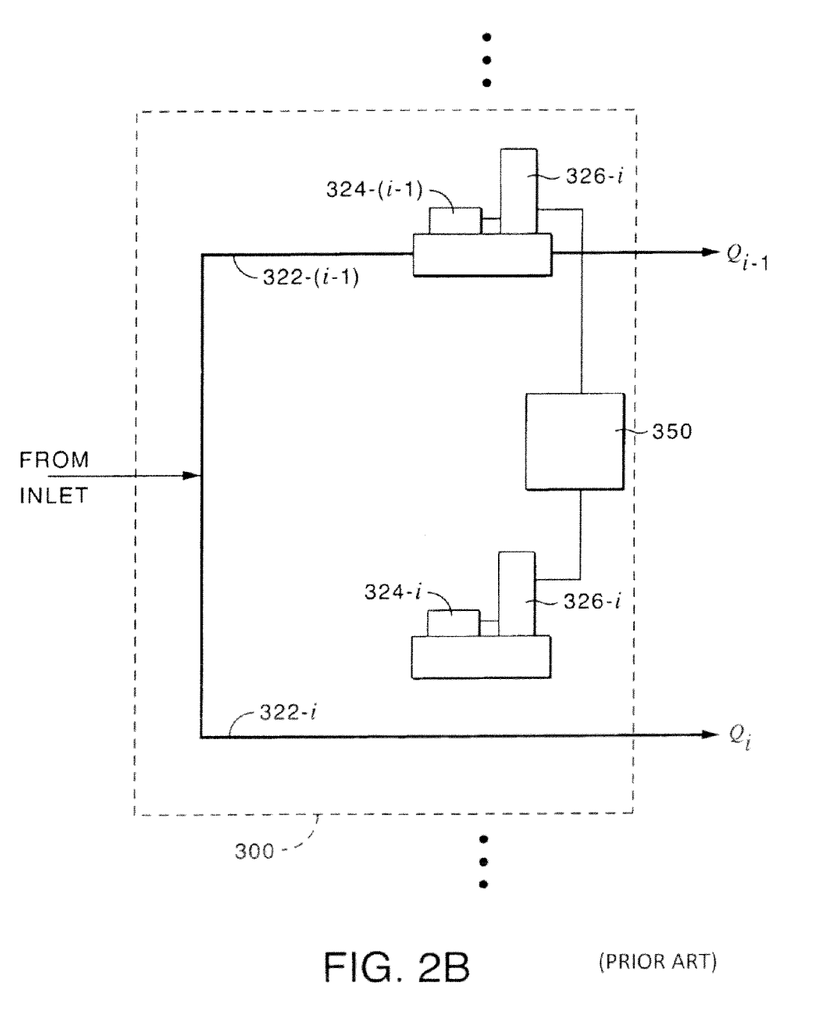
FIG. 2B illustrates in more detail one of the FRCs in the MCFRC illustrated in FIG. 2A.

FIG. 2B illustrates in more detail an exemplary one of FRCs that make up the MCFRC 200 illustrated in FIG. 2A. The FRC 300 shown in FIG. 2B is a dual-channel FRC 300 (although FRCs having a number of channels different from two may also be used). The FRC 300 may be either a master FRC or one of the slave FRCs in the MCFRC 200 shown in FIG. 2A, and includes secondary flow channels 322-$i$ and 322-($i$-1). Each secondary flow channel 322-$i$ includes a flow sensor 324-$i$ connected to measure flow through the corresponding flow channel 322-$i$, by analogy to the flow sensors 124-$i$ illustrated in FIG. 1A. Each secondary flow channel 322-$i$ further includes a valve 326-$i$ connected to regulate the flow through the corresponding flow channel 322-$i$, by analogy to the valves 126-$i$ illustrated in FIG. 1A.

The dual-channel FRC 300 further includes a valve controller 350 that is connected to the flow sensors and the valves in the dual-channel FRC 300, and that is configured to provide control signals to each valve in the dual-channel FRC 300, in response to the ratio set points from the host controller, so as to control mass flow in the corresponding flow channels until the ratios between the individual flow rates and $Q_T$ satisfy the ratio set points for the corresponding flow channels.

Figure 3:
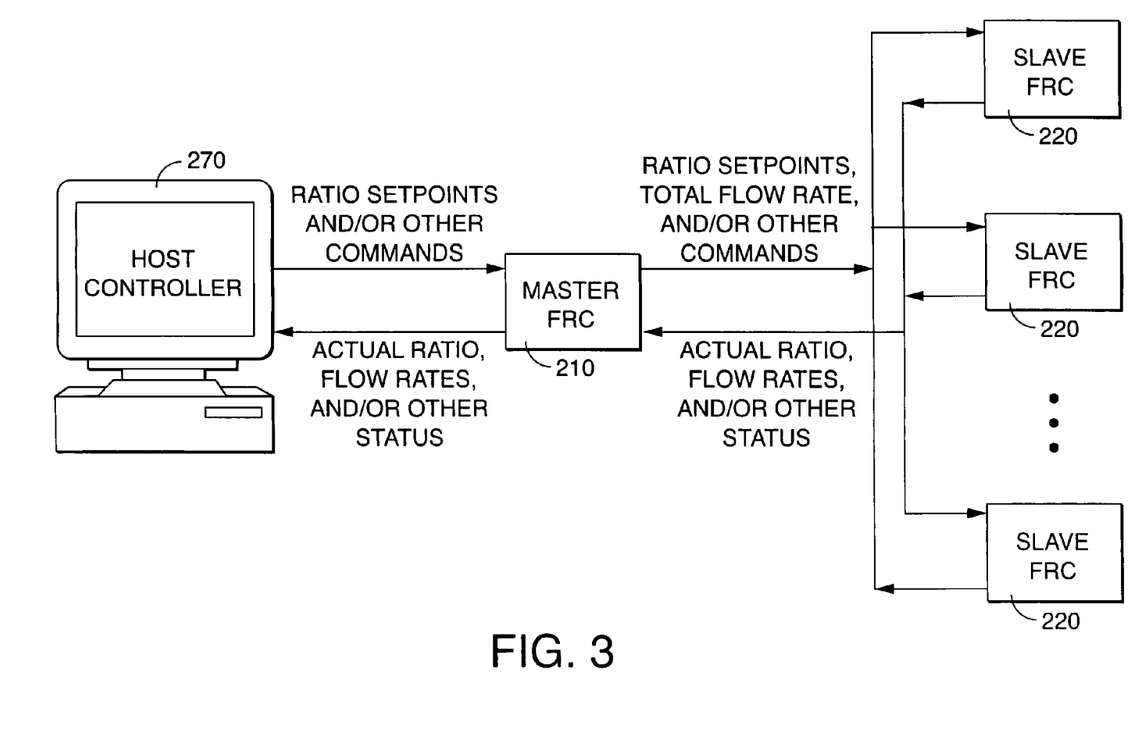
FIG. 3 is a functional block diagram that illustrates the exchange of communications between a host computer, the master FRC, and the plurality of slave FRCs, in the MCFRC illustrated in FIG. 2A.

FIG. 3 is a functional block diagram that illustrates in more detail the exchange of communications that may take place between the host controller 270, the master FRC 210, and the plurality of slave FRCs 220, in the MCFRC 300 illustrated in FIG. 2A. As seen in FIG. 3, each slave FRC 220 is configured to measure flow rates through its flow channels, and to communicate the measured flow rates to the master FRC. Each slave FRC 220 is further configured to compute actual ratios between the measured flow rates through its flow channels and the total flow rate $Q_T$, which the slave FRC 220 receives from the master FRC 210. Each slave FRC 220 also reports to the master FRC the actual ratios that it computed.

The master FRC 210 also measures flow rates through its flow channels. The master FRC 210 computes the total flow rate $Q_T$ by summing the measured flow rates through its own flow channels, as well as all the flow rates measured by, and received from, all the slave FRCs 220.

The master FRC 210 is further configured to receive from the host controller 270 command signals that indicate what the preselected ratio set points are. The master FRC 210 then communicates to all the slave FRCs 220 the total flow rate $Q_T$ and the preselected ratio set points.

The master FRC 210 and each one of the slave FRCs 220 are responsive to the preselected ratio set points, as contained in the command signals from the host controller 270, to control mass flow through their respective flow channels until all of the ratios $Q_i/Q_T$ ($i$=1, . . . , N) satisfy the preselected ratio set points.

The master FRC 210 can be further configured to report to the host controller 270 the measured flow rates and the actual ratios that the master FRC 210 has received from each slave FRC.

Figure 4:
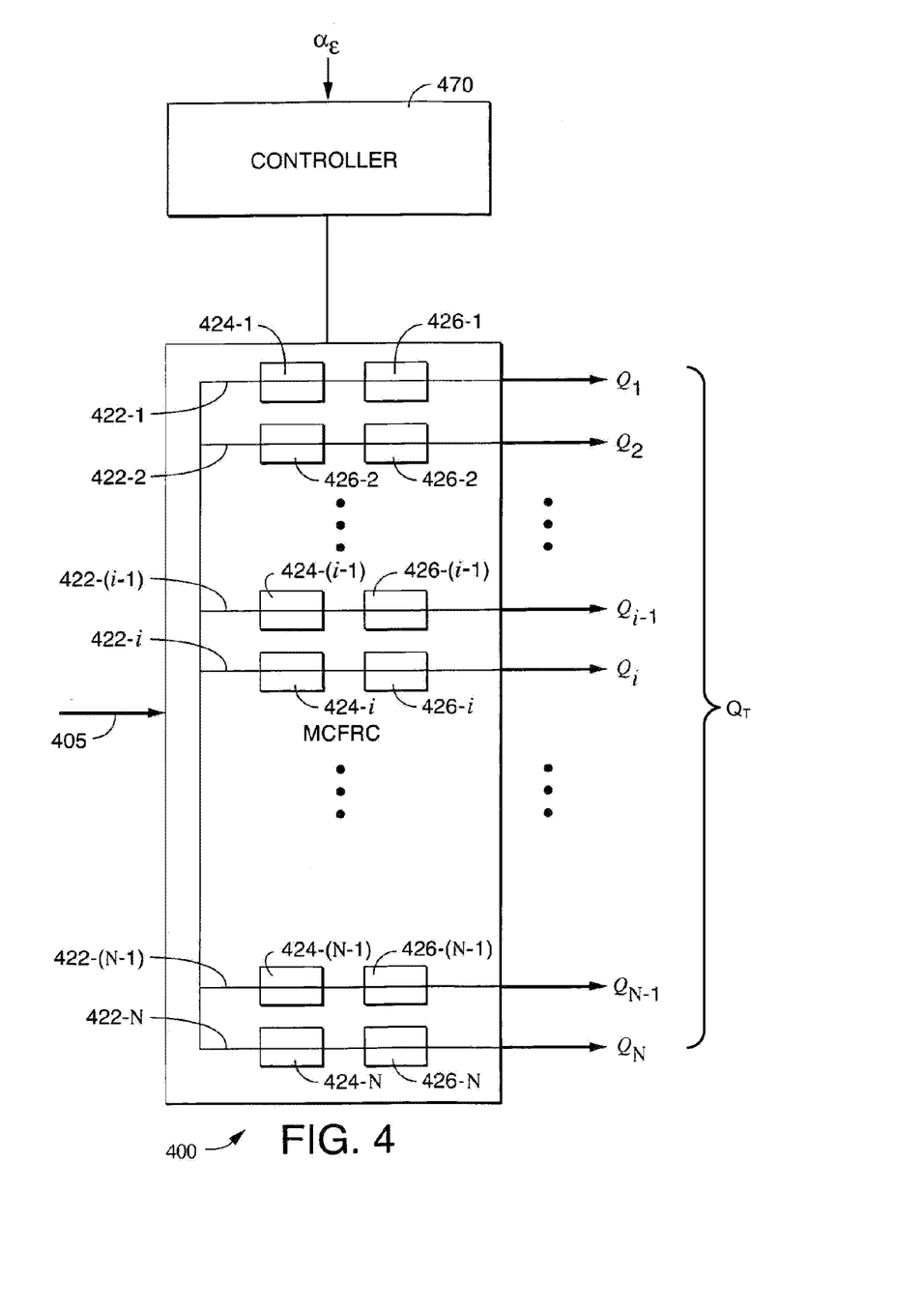
FIG. 4 is a general block diagram of an MCFRC that includes multiple flow channels and multiple control valves integrated within a single monolithic module, in accordance with another embodiment of the present disclosure.

FIG. 4 is a general block diagram of another embodiment of an MCFRC 400 configured to divide a single incoming mass flow into a plurality N of secondary flows ($i$=1, . . . , N). In this embodiment, the MCFRC 400 includes multiple flow channels and multiple control valves that are all integrated within a single monolithic module, without a master-slave configuration described above in conjunction with FIGS. 2A, 2B, and 3. The MCFRC 400 includes an inlet 405 configured to receive an incoming single mass flow, and a plurality N of secondary flow channels 422-$i$ ($i$=1, . . . , N) connected to the inlet 405.

Each secondary flow channel 422-$i$ in the MCFRC 400 is connected to carry a corresponding one of the N secondary flows $Q_i$ ($i$=1, . . . , N). Each flow channel 422-$i$ ($i$=1, . . . , N) includes a flow sensor 424-$i$ connected to measure a flow rate $Q_i$ through the flow channel i, and a valve 426-$i$ connected to regulate flow through the flow channel i in response to one or more control signals from a controller 470.

The controller 470 is configured to control the flow sensors 424-$i$ and the valves 426-$i$ in all of the N flow channels 422-$i$ so as to maintain ratios $Q_i/Q_T$ ($i$=1, . . . , N) between the individual flow rates $Q_i$ ($i$=1, . . . , N) in each flow channel and the total flow rate $Q_T$ at preselected ratio set points $\alpha_i$. As in previously described embodiments of an MCFRC, $Q_i$ represents individual flow rates in corresponding flow channels i, and $Q_T$ represents a sum $Q_T=Q_1+ \ldots +Q_i+ \ldots Q_N$ of all N individual flow rates. As also previously described, the preselected ratio set points $\alpha_i$ may be input into the computer by a customer, or other user or operator.

In sum, systems and methods have been described for multiple-channel flow ratio control. The systems and methods described above can be used in numerous applications, including but not limited to etching, stripping, and PECVD (Plasma Enhanced Chemical Vapor Deposition). The master-slave configuration for an MCFRC, described above in conjunction with FIGS. 2A, 2B, and 3, provides a cost-efficient and flexible method and system for multiple-channel flow ratio control. With this configuration, the total number N of secondary flow channels may be either fixed or variable. Compared to a cascaded configuration, the master-slave configuration may also substantially reduce footprint.

While certain embodiments have been described of systems and methods for multiple-channel flow ratio control, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of controlling flow in a plurality N of secondary flows that drive from a single mass flow, that is combined in an outlet manifold from two or more mass flows from a plurality of gas suppliers, each of the two or more mass flows individually being metered through a respective mass flow controller, the method comprising:

connecting a master FRC and one or more slave FRCs to an inlet configured to receive the single mass flow, the master FRC and the slave FRCs each including at least two secondary flow channels and including in combination a total of N flow channels, each flow channel i (i=1, ..., N) connected to carry a corresponding one of the N secondary flows, and wherein the master FRC and the slave FRCs are multiple-channel FRCs, each multiple-channel FRC respectively including at least two of the N flow channels, and wherein each secondary flow channel includes a respective flow sensor for measuring a real time flow rate through the flow channel and a valve for controlling gas flow through the flow channel;

with a digital communication bus, providing preselected flow ratios from a host controller to the master FRC for the master FRC and the one or more slave FRCs, wherein the digital communication bus is configured to provide communications between the master FRC and the one or more slave FRCs, or between the master FRC and the host controller; and the master FRC and the one or more slave FRCs maintaining, in all the flow channels, ratios $Q_i/Q_T$ (i=1, ..., N) between individual flow rates $Q_i$ (i=1, ..., N) of the respective secondary flows of respective secondary flow channels and total flow rate $Q_T$ at preselected ratio set points, wherein $Q_i$ represents individual flow rate in flow channel i, and $Q_T$ represents a sum $Q_T = Q_1 + \ldots + Q_i + \ldots Q_N$ of all N individual real time flow rates of the secondary flow channels as measured by the respective flow sensors;

wherein the master FRC is configured to receive preselected ratio set points from the host controller and to receive a real time flow rate measurement from each secondary flow channel, and to provide $Q_T$ to each of the slave FRCs, and to deliver to each of the one or more slave FRCs the respective preselected ratio set point along with one or more command signals; and wherein each slave FRC is responsive to an actual flow ratio, between a real time flow measurement for each of the associated flow channels and $Q_T$, by adjusting a flow rate of each of the secondary flow channels to satisfy a respective one of the preselected ratio set points received from the master FRC.

2. The method of claim 1, wherein the act of the master FRC and the slave FRC maintaining the ratios at the preselected ratio set points further comprises:

the master FRC controlling flow through its flow channels until the ratios between the individual flow rates through the flow channels of the master FRC and $Q_T$ satisfy the ratio set points for these flow channels; and the master FRC transmitting the one or more command signals to the one or more slave FRCs over the digital communication bus, so that the one or more slave FRCs control flow through their respective flow channels until the ratios between the individual flow rates through the flow channels of the slave FRCs and $Q_T$ satisfy the ratio set points for these flow channels.

3. A system for dividing a single mass flow, comprising:

an inlet configured to receive a single mass flow from an outlet manifold, the single mass flow being provided by two or more gas suppliers connected to the outlet manifold, each gas supplier comprising a metered amount of gas;

a plurality of FRCs (flow ratio controllers) connected to the inlet, wherein the plurality of FRCs comprises a master FRC and one or more slave FRCs, each FRC comprising at least two flow channels, each having a flow sensor for measuring a real time flow rate through the flow channel and a valve for controlling a portion of the single mass flow through the flow channel;

a controller operably connected to the master FRC, the controller configured to provide preselected flow ratios for plurality of the FRCs;

a digital communication bus connected to the controller and the master FRC and the one or more slave FRCs, and enabling communications between the master FRC and the one or more slave FRCs, or between the master FRC and the controller;

wherein each FRC is configured to maintain, based on its respective preselected flow ratio, a respective flow ratio between a real time flow rate measured at the FRC by a corresponding flow sensor of each of the flow channels of the FRC and a total flow rate as determined by the controller by summing all of the real time flow rates measured by the flow sensors of the plurality of FRCs, wherein the master FRC is configured to receive the preselected flow ratios from the controller and deliver one or more respective flow ratio set points to the one or more slave FRCs to maintain the respective flow ratio of each at the respective one of the preselected flow ratios.

4. The system of claim 3, wherein the master FRC is configured to compute the total flow rate ($Q_T$) by summing N individual flow rates $Q_i$ (i=1, ..., N) of each FRC through corresponding flow channels i (i=1, ..., N), and communicate to the one or more slave FRCs the total flow rate $Q_T$ and the ratio set points; and wherein the master FRC and each slave FRC are responsive to the preselected flow ratios provided by the host controller to control mass flow through their respective flow channels until all of the ratios $Q_i/Q_T$ (i=1, ..., N) satisfy the preselected flow ratios.

5. The system of claim 4, wherein each slave FRC is configured to measure one or more flow rates through its at least two flow channels, and to communicate the measured one or more flow rates to the master FRC; and wherein each slave FRC is further configured to compute actual ratios between the measured flow rates through its at least two flow channels and the total flow rate $Q_T$ received from the master FRC, and to report the one or more actual ratios to the master FRC.

6. The system of claim 5, wherein the master FRC is further configured to report to the host controller the measured flow rates and the actual ratios from each slave FRC.

7. The system of claim 4, wherein the master FRC is further configured to measure at least one flow rate through the at least two flow channels in the master FRC, and to compute the total flow rate $Q_T$ by summing the measured at least one flow rate through the flow channels in the master FRC with flow rates measured by and received from all the slave FRCs.

8. The system of claim 3, wherein each flow channel includes:

a flow sensor connected to measure flow through the flow channel; and a valve connected to regulate flow through the flow channel.

9. The system of claim 8, wherein each FRC includes a valve controller connected to the flow sensor and the valve in that FRC, the valve controller configured to provide a control signal to the valve in that FRC, in response to the preselected flow ratios provided by the host controller.

10. The system of claim 3, wherein the digital communication bus is connected to a network that comprises at least one of: Ethernet TCP/IP; UDP/IP; DeviceNet; CAN (Controller Area Network); RS-232; and RS-485.

11. The system of claim 3, wherein the number of flow channels is fixed.

12. The system of claim 3, wherein the number of flow channels is variable.

13. The system of claim 3, wherein the master FRC and the slave FRCs are connected to each other in a parallel configuration.

* * * * *